United States Patent
Winter

(10) Patent No.: US 7,483,620 B1
(45) Date of Patent: Jan. 27, 2009

(54) REPLAY APPLIANCE FOR ACCESSING A RECORDING MEDIA CONTAINING INFORMATION BLOCKS

(75) Inventor: Marco Winter, Hannover (DE)

(73) Assignee: Thomson Licensing, Boulogne Billancourt (FR)

( * ) Notice: Subject to any disclaimer, the term of this patent is extended or adjusted under 35 U.S.C. 154(b) by 842 days.

(21) Appl. No.: 09/469,865

(22) Filed: Dec. 22, 1999

(30) Foreign Application Priority Data

Dec. 23, 1998  (DE) .............................. 198 59 845

(51) Int. Cl.
*H04N 5/91* (2006.01)
(52) U.S. Cl. .......................................... 386/65; 386/69
(58) Field of Classification Search ................. 386/6–8, 386/68–70, 65, 125, 126, 46, 124; 360/72.1, 360/72.2, 72.3
See application file for complete search history.

(56) References Cited

U.S. PATENT DOCUMENTS

| | | | |
|---|---|---|---|
| 5,063,550 A | | 11/1991 | Watari et al. ............. 369/44.36 |
| 5,136,560 A | * | 8/1992 | Hangai et al. ............. 369/30.17 |
| 5,581,365 A | * | 12/1996 | Yumine ........................ 386/65 |
| 5,692,093 A | * | 11/1997 | Iggulden et al. ................ 386/46 |
| 5,706,261 A | * | 1/1998 | Udagawa .................. 369/30.03 |
| 5,715,356 A | | 2/1998 | Hirayama et al. ............. 386/96 |
| 5,845,331 A | * | 12/1998 | Carter et al. ................. 711/163 |
| 5,999,354 A | * | 12/1999 | Shitara ........................ 360/53 |
| 6,075,920 A | * | 6/2000 | Kawamura et al. ............ 386/95 |
| 6,091,674 A | * | 7/2000 | Tozaki et al. ............. 369/30.04 |
| 6,137,954 A | * | 10/2000 | Sawabe et al. ................ 386/95 |
| 6,343,180 B1 | * | 1/2002 | Kim ............................. 386/65 |

FOREIGN PATENT DOCUMENTS

| | | |
|---|---|---|
| DE | 3933974 A1 | 4/1990 |
| DE | 69408237 T2 | 3/1995 |
| EP | 0303369 | 2/1989 |
| EP | 0724264 A2 | 7/1996 |
| EP | 0793232 A2 | 9/1997 |

OTHER PUBLICATIONS

German Search Report citing the above-listed references: AM and AN.
European Search Report citing the above-listed references: AA, AM, AN, and AO.

* cited by examiner

*Primary Examiner*—John W Miller
*Assistant Examiner*—James A Fletcher
(74) *Attorney, Agent, or Firm*—Joseph J. Laks; Harvey D. Fried; Patricia Verlangieri

(57) ABSTRACT

A relay appliance at a defined playing time for accessing information on recording media containing information blocks, if the recording medium has no concordance list producing a relationship between the replay time and the recording location, or the concordance list is damaged. In order to access or to replay information from a recording medium at a defined playing time, the recording medium being, for example, a Digital Versatile Disk ("DVD") which does not include DVD Video Title Set Time Map Table, a replay appliance is provided which drives a scanning device using a binary search to a point on the recording medium which corresponds to the access point defined by the playing time. The field of application of the invention extends to replay appliances for recording media containing information blocks, such as a digital video/disc (also called a DVD).

12 Claims, 1 Drawing Sheet

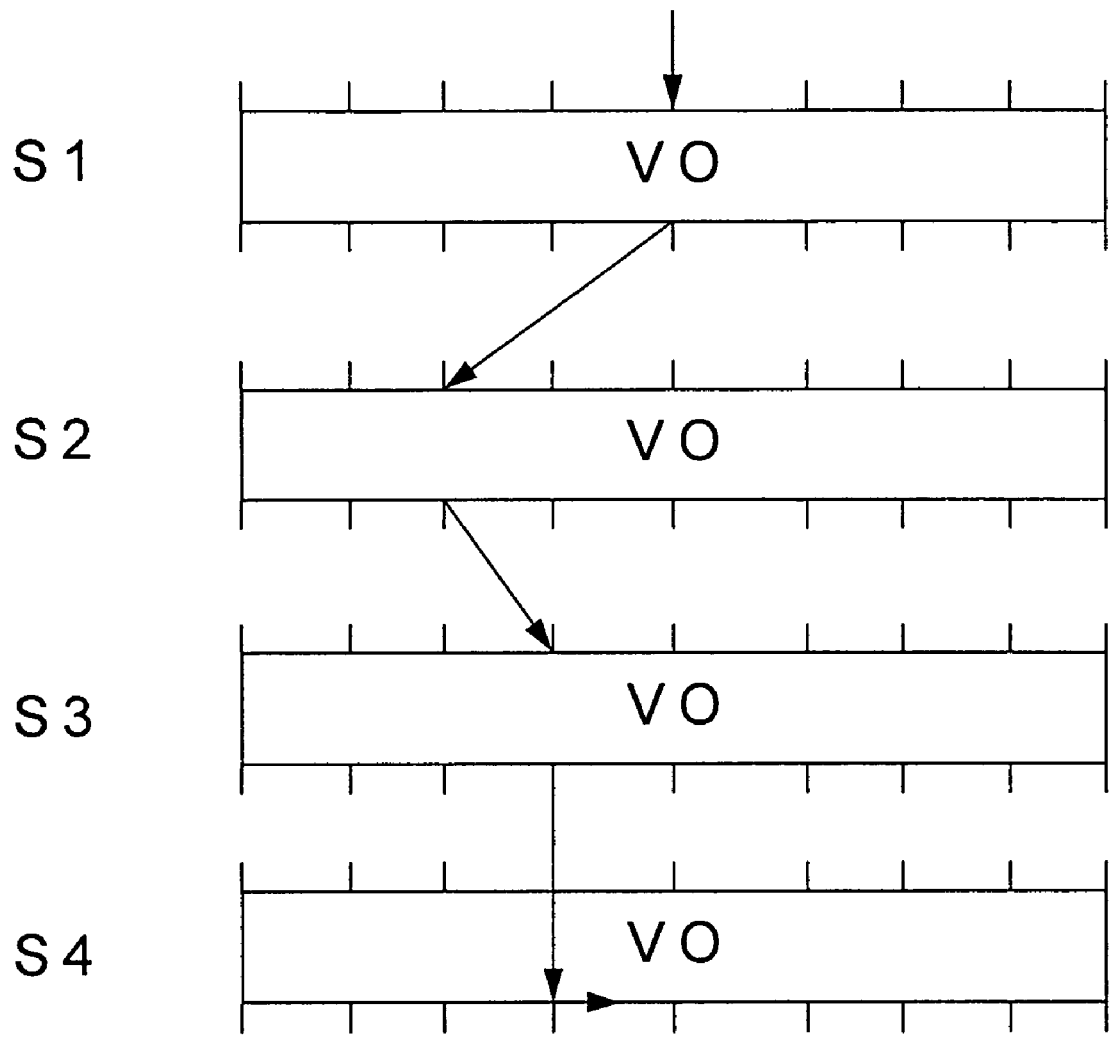
Figure

REPLAY APPLIANCE FOR ACCESSING A RECORDING MEDIA CONTAINING INFORMATION BLOCKS

FIELD OF THE INVENTION

The invention relates to a replay appliance for recording media containing information blocks, having means for access, at a defined playing time, to video information on a Digital Versatile Disc, which is also called a DVD, without a so-called DVD Video Title Set Time Map Table.

BACKGROUND OF THE INVENTION

According to the DVD Specification for read-only discs, Part 3, in Version 1.0, which contains the video specification, a so-called DVD Video Title Set Time Map Table is provided on the DVD disc, by means of which can be accessed as a function of the playing time, in order to replay a video sequence of a movie from a desired playing start time. This table contains all the necessary information and entry points to allow a replay appliance to be used to directly access a video sequence which corresponds to a specific replay time or running duration or, for example, to start replaying a movie which has been recorded on a DVD from a time which corresponds to a predetermined playing time in the film. If, for example, the first ten minutes of a movie are skipped, then the Video Title Set Time Map Table can be used to jump directly to the point in a movie which corresponds to this replay time when viewed continuously. Using the data contained in the Video Title Set Time Map Table on the disc, the scanning device in the replay appliance is driven directly to a scanning point on the disc which contains the data corresponding to a predetermined replay time.

The Video Title Set Time Map Table contains the recording point for the video data in each program chain in the video title for each time during replay.

However, it is only optional for this table to be provided on the disc, so that it is not generally available in the replay appliance for finding a recording point on the disc corresponding to a replay time which can be predetermined.

SUMMARY OF THE INVENTION

The object of the invention is to provide a replay appliance for recording media containing information blocks, which allows access, at a defined playing time, to video information on a DVD even without a DVD Video Title Set Time Map Table being recorded on the disc.

This object is achieved by means specified in independent claims, and advantageous refinements and developments are specified in dependent claims.

One aspect of the invention is to allow access, at a defined playing time, to video information on a DVD, despite there not being a DVD Video Title Set Time Map Table or the DVD Video Title Set Time Map Table being damaged.

According to the invention, means are provided in the replay appliance, using which the recording medium is searched for a characteristic feature. It has been found that recording media having information blocks have so-called designators that are used, in an advantageous manner, to find so-called navigation sectors on the disc. The sectors of the recording medium are searched using a means provided in the replay appliance, using which means the data stream read from the recording medium is analyzed to find a navigation sector designator. If such a designator is found, a statement about the present replay time contained in the navigation sector information is evaluated and is compared with a predetermined playing time from which it is intended to replay information stored on the recording medium. As a result of the comparison, a determination is made as to whether a point corresponding to the desired playing duration is located on the recording medium before or after the point at which the navigation sector designator and the replay time contained in the navigation sector information were found. The recording medium is then scanned at a point corresponding to the determined direction, and the process is repeated until the desired start position or a predetermined start region for replaying is found.

Thus, using a replay appliance for recording media containing information blocks, this allows access, at a defined playing time, to video information on a DVD in an advantageous manner, likewise using a binary search, when said DVD has no DVD Video Title Set Time Map Table or a DVD Video Title Set Time Map Table which cannot be evaluated. In this case, the term binary search covers the comparison of information read from the recording medium which matches a binary word that characterizes the designator, and the evaluation of binary information which is contained in one of the files which are identified by the designator.

The invention will be explained in more detail in the following text with reference to a drawing.

BRIEF DESCRIPTION OF THE DRAWING

The FIGURE shows an exemplary embodiment for access, at a defined playing time, to video information on a DVD even without a DVD Video Title Set Time Map Table being recorded on the disc.

DETAILED DESCRIPTION OF THE PREFERRED EMBODIMENTS

Since no time code corresponding to the CD Audio is available, owing to the breakdown and interleaving of the information stored in information blocks, for access, at a defined playing time, to video information, it must initially be assumed that it is impossible to replay, at a defined playing time, a recording medium having information blocks when there is no DVD Video Title Set Time Map Table or the DVD Video Title Set Time Map Table is damaged.

Corresponding to the invention, the replay appliance contains a search means for finding a designator, which in this case is a navigation sector designator that is also referred to as NV_PCK ID. The search means is preferably a mask, which corresponds to the binary word of the navigation sector designator and is used to find the navigation sector designator in the data stream read from the recording medium. The method for finding the navigation sector designator using a mask corresponding to the binary word of the navigation sector designator may be either an iterative approximation method, as is illustrated in the FIGURE, or else other search methods, for example a continuous search in the forward or reverse direction, or a search starting from an estimated value. In order to replay, at a defined playing time, a recording medium having information blocks, using the iterative approximation method, the recording medium is first of all scanned, in a first step S1, at a position which corresponds approximately to the center of the recording medium. This physical point on the recording medium will, however, as a rule not correspond to half the replay duration of an item of video information (called a video object VO) on the disc, since the replay duration and the physical point on the disc are not proportional owing to the data and recording structure. Furthermore, the amount of data required for replaying depends on the nature of the video object VO, since, as a rule, the only information recorded is that which relates to changes from one frame to the following frame. A very wide tolerance can therefore be allowed for the first point on the recording medium that is to be driven to by a scanning device in the replay appliance.

From the point on the recording medium, which the scanning device of the replay appliance jumps to, the information recorded there is then read and is compared with a mask that corresponds to the binary word of the navigation sector designator. As soon as a navigation sector designator has been detected, information contained in the navigation sector information, which is also called the navigation packet NV-PCK, is then evaluated relating to a replay time which corresponds to the playing time from the start if the video information were replayed continuously. The means required to evaluate this replay time, which is also called the playback time PGC, are already provided in the replay appliance for continuously replaying video information, so that there is no need for any further explanation relating to this. A relationship between the recording point and the replay time is then produced by a binary search carried out in this way and is used to approach a point on the recording medium which must be found and scanned for replaying at a defined playing time, even without a DVD Video Title Set Time Map Table. By comparing the replay time determined at the scanning point with the time from which replaying at a defined playing time is intended to take place, that point is then defined at which the recording medium must be scanned in a second step S2 unless a match has already been found. In the example shown in the FIGURE, the aim is to replay, with a defined playing time, from a playing time which is located before the determined position, so that the recording medium is scanned by the scanning device in this second step S2 at a point which is also physically located before the point on the recording medium that was scanned in the first step S1. This second point may also be an arbitrary point in the region before the point scanned in the first step S1. However, it is also possible to determine the time difference between the replay time determined in the first step S1 and the desired playing time, and to define a jump distance corresponding to the result.

A binary search is then carried out once again at the second point, which results in a determination being made as to whether a point to be sought for replay at a defined playing time is located before or after the present scanning position. If the replay time determined in the second step S2 is not so far away from the desired playing time, a third point on the recording medium is scanned, depending on the result of the comparison, in a third step S3. In accordance with the FIGURE, a replay time was determined in the step S2 which is located before the desired playing time, so that the scanning device of the replay appliance is driven, in a third step S3, to a point on the recording medium which is located after the point on the recording medium scanned in the second step S2 and before the point on the recording medium scanned in the first step S1. Using an iterative approximation method, a point on the recording medium which corresponds to a desired playing time is thus found even without a DVD Video Title Set Time Map Table, and the process of replaying starts at a defined playing time in the fourth step S4.

To reduce the number of steps to be carried out in order to determine the scanning point on the recording medium corresponding to replaying at a defined playing time, it is possible to use a tolerance window, which starts the replay process at a distance from a predetermined playing time.

The invention is intended for use in a replay appliance for recording media containing information blocks, having means for access, at a defined playing time, to video information on a Digital Versatile Disc, called a DVD, even without a so-called DVD Video Title Set Time Map Table, and can in general be used for access, at a defined playing time, to information on a recording medium where there is no proportionality between the recording point and the replay time and no concordance list is available defining the relationship between the replay time and the recording point.

The invention claimed is:

1. Replay appliance for a recording medium containing information blocks, having means for accessing at a defined playing time information stored on the recording medium containing information blocks without time code information recorded in each sector of the recording medium for correlating a replay time with a recording location and without a concordance list that correlates replay time with recording location, the appliance comprising:
    a scanning device for scanning data on a recording medium;
    search means for binary searching recording points on the recording medium, analyzing a data stream read from the recording medium to find a designator on the basis of a replay time; and
    a comparator for comparing a replay time contained in the information following said designator which has been scanned from the recording medium with a desired replay time, wherein the scanning device scans the recording medium by said binary search at a point which corresponds to a result of a comparison by the comparator to access at the defined playing time.

2. Replay appliance according to claim 1, wherein the search means for binary searching is a comparator for comparing information read from the recording medium with a binary word, and an evaluator for evaluating a recording medium replay time contained in a file associated with the binary word.

3. Replay appliance according to claim 2, wherein the comparator is a mask for comparing information read from the recording medium with a binary word.

4. Replay appliance according to claim 2, wherein the binary word is a designator recorded on the recording medium.

5. Replay appliance according to claim 4, wherein the designator is a navigation sector designator.

6. Replay appliance according to claim 1, wherein the desired replay time is a replay time which is intended for access, at a defined playing time, to the recording medium.

7. Replay appliance according to claim 1, wherein the desired replay time is a replay time provided within a tolerance window, for access, at a defined playing time, to the recording medium.

8. Replay appliance according to claim 1, wherein the comparator for comparing a replay time that has been found with a desired replay time drives the scanning device to a point on the recording medium which corresponds to the result of the comparison.

9. Replay appliance according to claim 1, wherein for access at a defined playing time, the comparator drives the scanning device to a point on the recording medium which corresponds to the defined playing time.

10. Replay appliance according to claim 1, wherein the scanning device is controlled using an iterative approximation method to a point on the recording medium which corresponds to the defined playing time.

11. Replay appliance according to claim 3, wherein the binary word is a designator recorded on the recording medium.

12. Replay appliance according to claim 11, wherein the designator is a navigation sector designator.

* * * * *